J. D. Dale,
Cutter Head,
Nº 9,515.                    Patented Jan. 4, 1853.
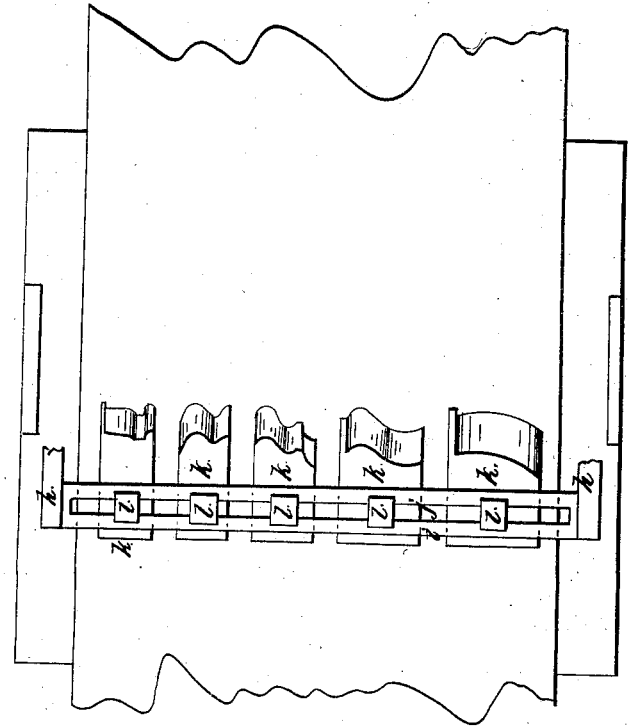
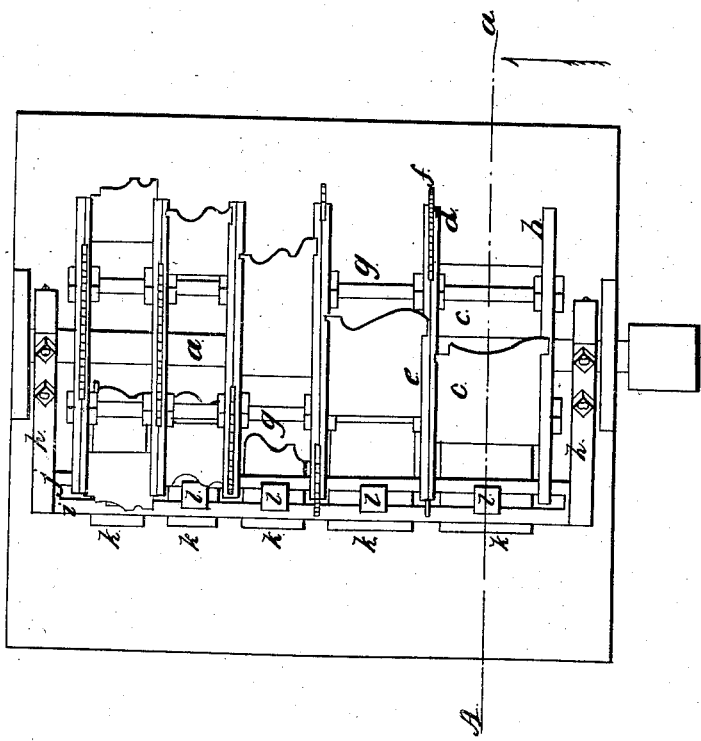
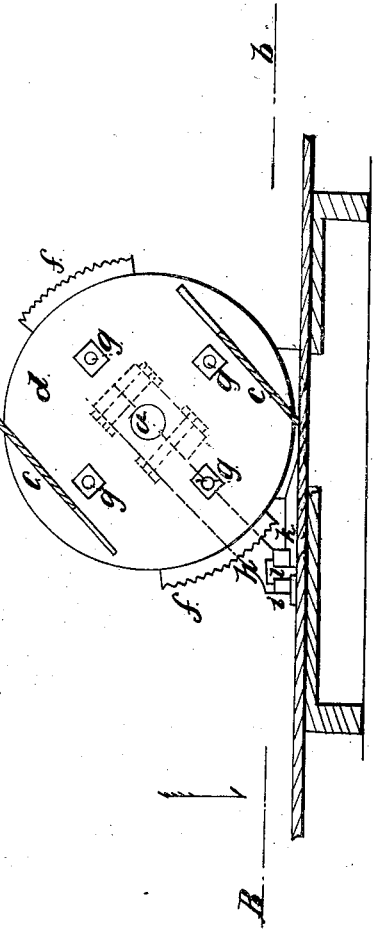

UNITED STATES PATENT OFFICE.

JOHN D. DALE, OF PHILADELPHIA, PENNSYLVANIA.

MACHINE FOR PLANING MOLDINGS.

Specification of Letters Patent No. 9,515, dated January 4, 1853.

*To all whom it may concern:*

Be it known that I, JOHN D. DALE, of Philadelphia, in the State of Pennsylvania, have invented certain new and useful Improvements in Machinery for Planing Moldings, and that the following is a full, clear, and exact description thereof, reference being had to the accompanying drawings, making part of this specification, in which—

Figure 1, is a plan; Fig. 2, a vertical section taken at the line A, $a$, of Fig. 1, and Fig. 3 a horizontal section at B, $b$, Fig. 2.

The same letters indicate like parts in all the figures.

The object of my invention is to plane a plank into a series of moldings, and separate them from each other at one operation, and to this end the nature of my invention consists in arranging a series of molding cutters or plane irons side by side and along the length of, and around an axis of rotation when this is combined with rotating saws or their equivalents for slitting or separating the several moldings at the same operation, whereby the operations are not only simplified, but accurate work is insured.

The accompanying drawings represent all the improvements which I have made, as any one versed in the art of constructing and working planing machines will be enabled to apply them to use.

In the said drawings $a$ represents a shaft mounted in suitable boxes and $b$ a permanent head near the end thereof. The inner face of this head is formed with suitable grooves or flanches to receive a set of molding cutters or plane irons $c$, with the out or cutting edges in form the reverse of a molding desired to be planed. Another disk $d$, is then slipped onto the shaft $a$, to the inner face of which is also fitted, and in like manner, the other side of the cutters or plane irons $c$. Another $e$ is then slipped onto the shaft and up against the one $d$ with segments $f, f,$ of a circular saw interposed and firmly gripped between the two disks, the periphery of these segments projecting sufficiently beyond the cutters to slit the plank before its surface is planed. In this way any number of sets of molding plane irons may be arranged side by side on the same shaft as represented in the drawings, the disks between the sets of plane irons being double and with segment saws interposed in manner similar to that above described. Screw bolts ($g$ $g$ $g$ $g$) are then passed through holes in all the disks and head in lines parallel with the shaft and provided with securing and tightening nuts on each side of each set of disks by means of which the whole is properly bound into a whole rotating molding and sawing head. The plane iron and the saws can be connected with the shaft in any other suitable manner at the discretion of the constructor. At each end of this rotating stock of plane irons and saws, and hung on the shaft thereof are arms $h$ $h$, one at each end, and to the outer end of these arms is properly secured a metal bar $i$, formed with a slot $j$ extending nearly its whole length, and to the under surface of this bar are secured a series of plates $k$ by means of screw-bolts $l$, passing through the slot $j$, so that the said plates can be shifted at pleasure for adjustment. There is one of these plates for each set of molding cutters that is for each division of the rotating stock. The forward edge of each plate is so formed as to fit accurately the cutting edges of the cutters, and so near as just to allow of the passage of the cutters. Sufficient space must be left between the several plates for the passage of the saws.

From the foregoing it will be seen that as the plank to be planed varies in thickness as it passes under the series of plates, they—the plates—by reason of their axis of motion being coincident with the axis of rotation of the planes, will always make pressure on the surface of the plank at the same distance from the cutting edges, and that therefore, when properly set will effectually prevent the splitting of the grain of the wood forward of the cutters. And it will also be seen that by the means above described, a plank of any breadth, can, at one operation, be planed into any desired number of moldings all of which are separated.

When the moldings to be made have any sharp angles, to avoid the difficulty of forming and sharpening the cutters at the angles, I make separate cutters for each part of the molding, and place them on the stock at different part of the circle.

Instead of having the saws or their equivalent, for separating the series of moldings which are planed at one operation, on one plank attached to the same shaft with the cutters they may be placed on a separate shaft, although I prefer to arrange them as fully described above.

I do not wish to limit myself to the manner of constructing the rotating stock and attaching the plane irons and saws thereto, nor to the manner of constructing and attaching the pressure plates as these may be varied without changing the character of my invention.

The mode of constructing the frame and the other parts of the machine, the gearing, and the manner of applying power to the pressure plates are not described or represented as these make no part of my invention, and are well known to persons acquainted with the art of planing by power machinery.

What I claim as my invention and desire to secure by Letters Patent is—

Arranging a series of sets of molding cutters or plane irons side by side along the length of a rotating stock substantially as specified, when this is combined with rotating saws or their equivalents interposed and projecting beyond periphery of the cutter, for separating the several moldings formed on one plank, substantially as specified, whereby the operations of planing the several moldings and separating them are performed at one and the same operation, and accuracy of work secured as set forth.

JOHN D. DALE.

Witnesses:
CANSTEN BROWN,
JOHN K. HAMLIN.